Figure 1:
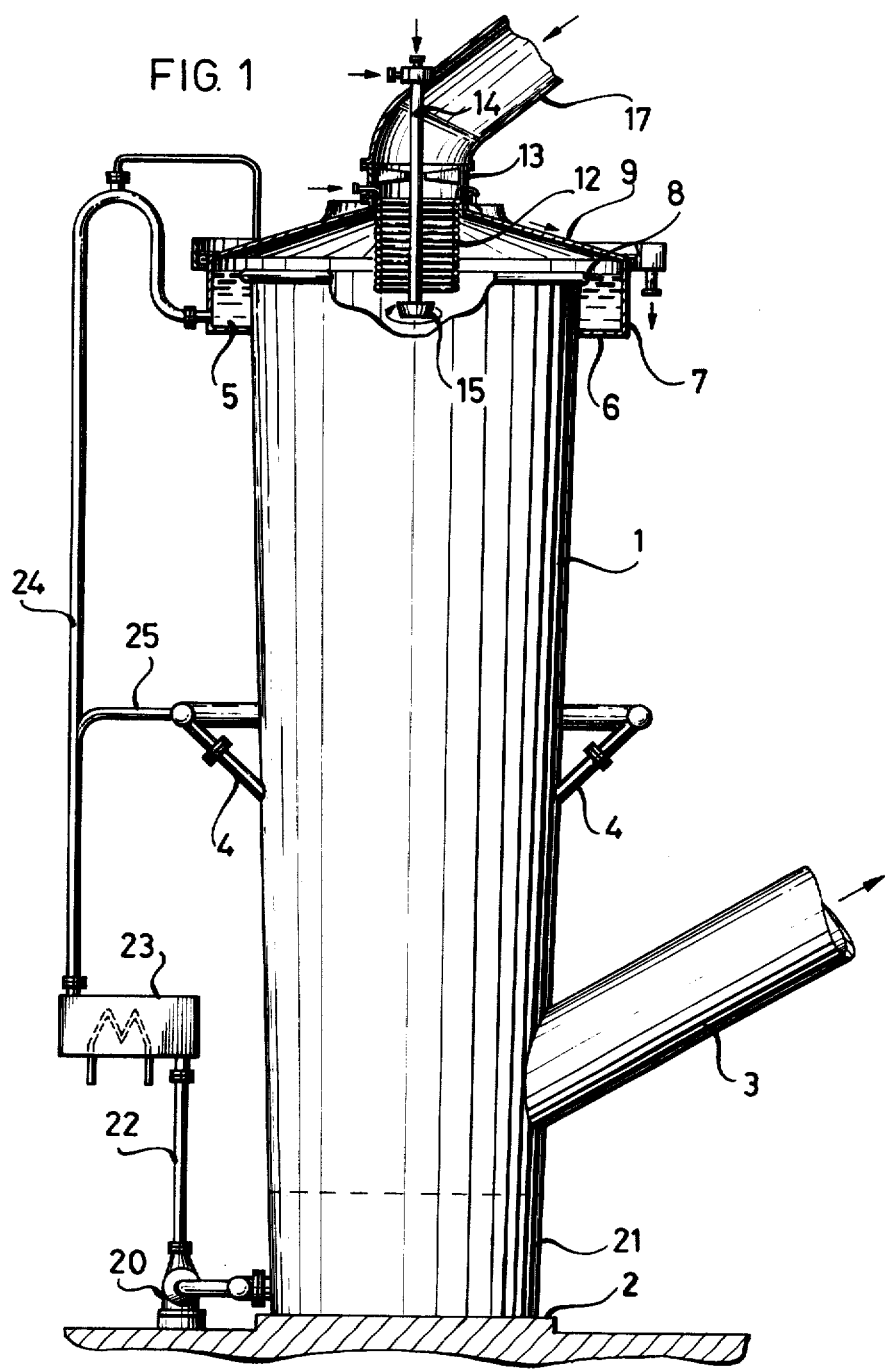

United States Patent [19]

Thümmler et al.

[11] 4,252,770
[45] Feb. 24, 1981

[54] APPARATUS FOR THE PRODUCTION OF PHOSPHORIC ACID

[75] Inventors: Ursus Thümmler, Erftstadt; Hugo Werner, Hürth, both of Fed. Rep. of Germany

[73] Assignee: Hoechst Aktiengesellschaft, Frankfurt am Main, Fed. Rep. of Germany

[21] Appl. No.: 85,483

[22] Filed: Oct. 17, 1979

[30] Foreign Application Priority Data

Oct. 20, 1978 [DE] Fed. Rep. of Germany ....... 2845642

[51] Int. Cl.³ .................. B01J 19/02; B01F 5/00; F28D 7/02; C01B 25/16
[52] U.S. Cl. .................. 422/194; 422/202; 422/224; 422/234; 422/235; 422/240; 423/317
[58] Field of Search ............ 422/194, 202, 224, 228, 422/232, 234, 235, 240, 241; 423/316, 317

[56] References Cited

U.S. PATENT DOCUMENTS

| | | | |
|---|---|---|---|
| 2,708,620 | 5/1955 | Winnicki | 423/317 |
| 3,057,700 | 10/1962 | Gross | 422/235 |
| 3,272,597 | 9/1966 | Beltz et al. | 422/234 X |
| 3,526,482 | 9/1970 | Beltz et al. | 422/235 X |
| 3,810,740 | 5/1974 | Berg et al. | 423/317 X |
| 4,098,582 | 7/1978 | Takeda | 422/225 X |

*Primary Examiner*—Joseph Scovronek
*Attorney, Agent, or Firm*—Connolly and Hutz

[57] ABSTRACT

The invention relates to an apparatus for the production of phosphoric acid by subjecting yellow phosphorus to combustion inside a combustion tower, the apparatus comprising a cone-shaped shell with a flat bottom of acidproof material forming the combustion tower, the cone ratio of the shell being 1:10 to 1:12. An upwardly-directed off-gas outlet is secured to the lower portion of the shell and a plurality of downwardly directed spray nozzles is arranged so as to open through the middle portion of the shell into the interior of the combustion tower. An acid-receiving cup with an overflow weir is positioned near the upper end of the shell, the acid-receiving cup surrounding the combustion tower concentrically, being gas-tightly connected to, and supporting, a self-supporting cone-shaped tower cover having a passageway passed centrally through it. The overflow weir is formed of a tubular-annular structure disposed completely horizontally inside the acid-receiving cup. The tower cover forms, with respect to the horizontal, an angle α of at least 19°. A water-cooled air inlet and a tubular holding means terminating in a phosphorus spray nozzle are hooked concentrically with respect to one another in, and are passed through the passageway in the cover.

4 Claims, 2 Drawing Figures

APPARATUS FOR THE PRODUCTION OF PHOSPHORIC ACID

The present invention relates to an apparatus for the production of phosphoric acid by subjecting yellow phosphorus to combustion inside a combustion tower, the apparatus comprising a cone-shaped shell with a flat bottom of acid-proof material forming the combustion tower; an upwardly-directed off-gas outlet directly secured to the lower portion of the shell; a plurality of downwardly directed injection nozzles opening through the middle portion of the shell into the interior of the combustion tower; an acid-receiving cup with an overflow weir positioned near the upper end of the shell, the acid-receiving cup surrounding the combustion tower concentrically, being gas-tightly connected to, and supporting, a self-supporting cone-shaped tower cover having a passageway passed centrally through it; and a tubular holding means terminating in a phosphorus spray nozzle being passed through said passageway in said cover.

It has already been described that phosphoric acid can be produced by burning yellow phosphorus inside a rubber-lined steel tower formed of a cone-shaped shell with a flat bottom portion, the steel tower having an acidproof ceramic brick lining secured to its inside. Butt-connected to the lower portion of the shell forming the steel tower is an upwardly directed off-gas outlet and arranged so as to open through the middle portion of the shell into the interior of the tower is a plurality of downwardly-directed spray nozzles. The upper portion of the tower terminates in a water-cooled cover which has a combustion nozzle centrally passed therethrough (cf, WINNACKER-KÜCHLER: "Chemische Technologie", vol. 1 Anorganische Technologie I, 1970, pages 394/395).

The steel tower just described is, however, not fully satisfactory inasmuch as rubber and ceramic brick-lined inside walls of a tower are liable to become leaky whenever they cease to be sprayed with sufficient quantities of circulated phosphoric acid. Needless to say, it is a very cumbersome and expensive procedure to repair leaks in a multilayer tower of the type described. In addition to this, the tower cover, of which the ribbed structures remain uncooled, undergoes heavy wear under the heat radiated by a phosphorus flame, those portions of the cover which are not sufficiently cooled by flowing water being subjected to particularly heavy stress.

It is therefore an object of the present invention to provide an apparatus for the production of phosphoric acid by burning yellow phosphorus comprising a combustion tower and cover which are considerably less liable to undergo wear and which permit leaks, if any, to be repaired in simple manner.

To this end, the invention provides for the combustion tower to be made up of acidproof steel; for the shell forming the combustion tower to present a cone ratio fo 1:10 to 1:12; for the self-supporting tower cover to form, with respect to the horizontal, an angle $\alpha$ of at least 19° and to be provided with a central passageway having a water-cooled tubular air inlet hooked therein concentrically with respect to the tubular holding means; and for the overflow weir to be formed of a tubular annular structure disposed completely horizontally inside the acid-receiving cup.

Further preferred features of the present invention provide:
(a) for the combustion tower to be made up of construction material No. 1.4571 of DIN-Specification 17 440 (DIN stands for German Industrial Standard);
(b) for the combustion tower to be made up of construction material No. 1.4505 of DIN-Specification 17 440;
(c) for the angle $\alpha$ to be equal to at most 25°;
(d) for the tubular air inlet to comprise a plurality of separate adjacent tubular coils;
(e) for a plurality of air flow-defining blades to be mounted as an annular set on the central passageway provided in the tower cover, the individual blades being adjustable from the outside;
(f) for a barrier ring to be mounted on the tower cover concentrically with respect to the central passageway therein;
(g) for a flexible rubber lip to be arranged concentrically with respect to the barrier ring, the lip being loosely supported by the tower cover; and
(h) for the acid-receiving cup to have a runoff gutter with a plurality of overflows secured to its outside near its upper end.

The cone ratio selected for the combustion tower of the present invention makes it possible for the phosphoric acid film cooling, and running down, the inside wall of the tower to have a sufficient thickness and reliably to remain in contact therewith. In other words, this enables the combustion tower made up of acidproof steel to be operated without any need for it to be water-cooled from the outside.

Needless to say, the monowall acidproof steel shell selected for the combustion tower of this invention enables leaks, if any, to be repaired within short periods of time.

The tower cover is made steep enough to be self-supporting for a minimum thickness of the sheet metal and to be left free from reinforcing ribbed structures. In other words, flowing water sprayed over the tower enables it to be cooled under optimum conditions and to be reliably protected against corrosion.

As already mentioned above, the tower cover of the present apparatus has a flexible rubber lip secured thereto to ensure the regular distribution of water so as to form a film on the surface of the tower, irrespective of the possible supply of varying quantities of water. The flexible lip used in accordance with this invention makes it also possible for the gap left between lip and cover to be cleaned automatically.

Air, which is drawn in through an air intake bend, and phosphorus are homogeneously mixed inside the apparatus of this invention, inasmuch as the flow-defining blades with individually adjustable angle of impingement are arranged so as to cooperate with the tubular air inlet.

As described hereinabove, the invention provides for the tubular air inlet to comprise a plurality of separate adjacent tubular coils which are separately cooled with water passed therethrough at a high speed. This results in the service life of the air inlet, of which the outside is normally subject to particularly heavy corrosion, being considerably increased.

Figure 2:
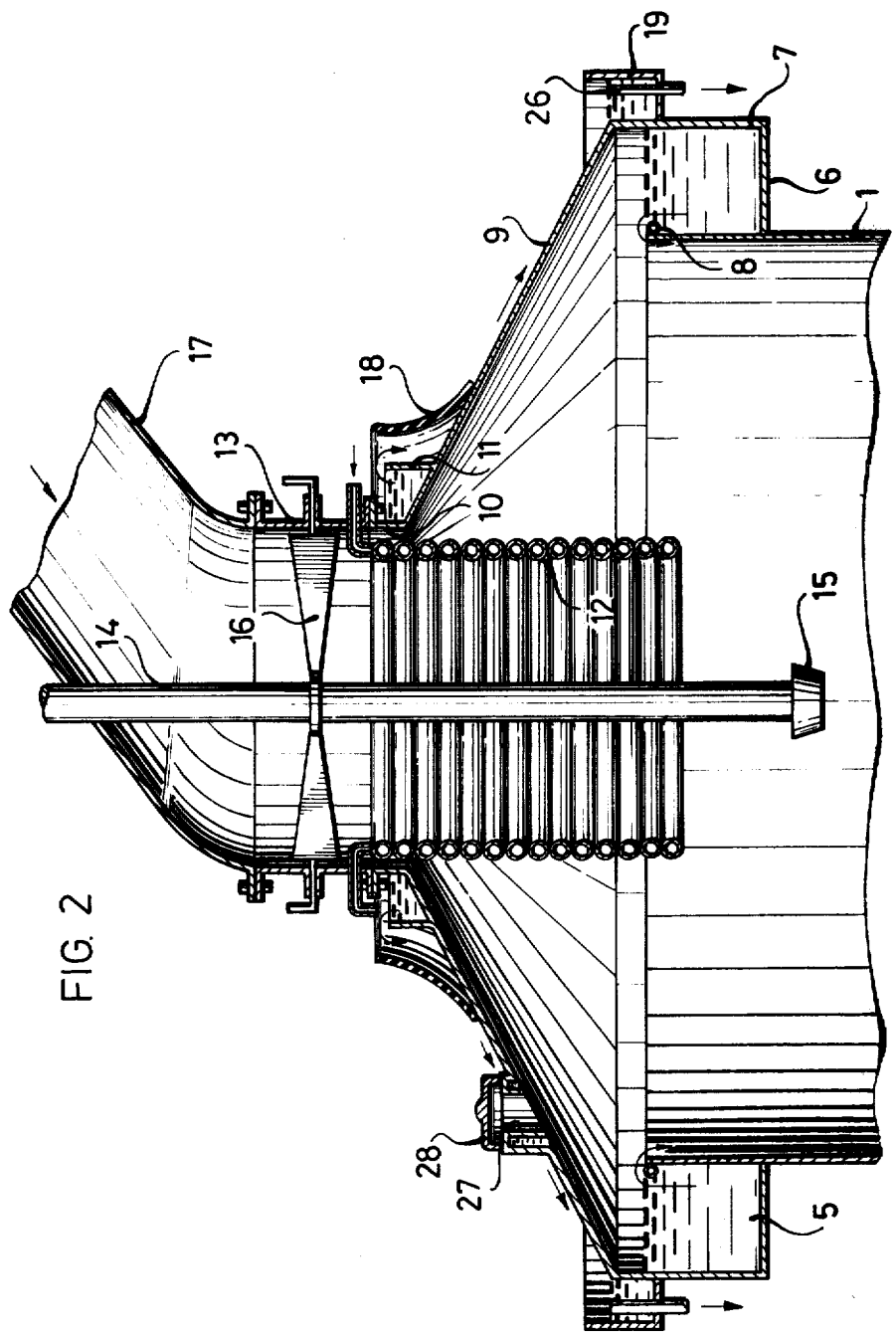

The invention will now be described with reference to the accompanying drawings showing a diagrammatic and exemplary form of apparatus, of which FIG. 1 is a side elevational view of the apparatus of this invention and FIG. 2 is a representation, on an enlarged scale, of the upper portion of FIG. 1.

With reference to the drawings:

Mounted on a base 2 is a self-supporting combustion tower 1 which can be freely extended upwardly and which is comprised of a cone-shaped shell with a flat bottom. In its lower portion, the combustion tower 1 has an upwardly directed tubular off-gas outlet 3 butt-connected to the shell. A plurality of downwardly directed spray nozzle structures 4 are arranged so as to open through the middle portion of the shell into the interior of the combustion tower 1.

An acid-receiving annular cup 5 formed of an annular bottom plate 6 and a cylindrical jacket 7 is arranged so as to concentrically envelop the combustion tower 1 near its upper end. Secured exactly horizontally to the upper end of the combustion tower 1 is a tubular annular structure 8 forming the overflow of the acid-receiving cup 5. Mounted on the upper end of the cylindrical jacket 7 and gas tightly connected therewith is a cone-shaped tower cover 9 provided with a passageway passed centrally through it. The central passageway through the cover 9 is bounded by a socket 10 which is provided with an upper flange and has a barrier ring 11 arranged concentrically around it. Hooked in the socket 10 is a water-cooled tubular air inlet 12 comprising a plurality of separate coils, of which each has a separate water intake connection. Flow-defining blades 16 arranged as an annular set are screw or bolt-connected to the tubular air inlet 12 and the socket 10. Passed through a central opening in the ring 13 of flow-defining blades is a holding means 14 opening downwardly into the interior of the combustion tower and terminating in a phosphorus spray nozzle 15. The flow defining ring 13 has flow-defining blades 16 adjustable from the outside and is screw or bolt-conected by means of the upper flange to an air intake bend 17.

Cooling water coming from the tubular air inlet 12 flows over the barrier ring 11 on to the cover 9, the barrier ring retaining a quantity of water necessary for practically the entire socket 10 to have the water circulated around it. Disposed concentrically with respect to the barrier ring 11 is a flexible rubber lip 18 which lies loosely on the upper side of the cover 9, and which is intended to ensure the regular distribution of cooling water overflowing the barrier ring 11 so as to produce a film of water on the surface of the cover 9. The cylindrical jacket 7 forming part of the acid-receiving cup 5 has a runoff or collecting gutter 19 with a plurality of overflows 26 secured to it which enables those portions of the acid-receiving cup 5 which are not filled with acid to be cooled from the outside by means of water running off from the cover 9.

Provided in the cover 9 are several manholes 27 which reach into the tower, are closable by means of covers 28 and partially have water circulated around them, for inspection of the interior of the tower.

A rotary pump 20 of which the inlet side communicates with a reservoir of acid 21 in the lower portion of the combustion tower 1, is used to supply the acid-receiving cup 5 and spray nozzles 4, respectively, with circulated phosphoric acid through conduit 22, heat exchanger 23 and pipes 24 and 25, respectively.

What is claimed is:

1. In an apparatus for the production of phosphoric acid by burning yellow phosphorus by means of a combustion nozzle inside an acid-proof combustion tower slightly tapered downwardly and having a flat bottom in a lower portion; an off-gas conduit inclined upwardly with respect to the combustion tower being butt-secured to the lower portion of said tower; a plurality of downwardly directed injection nozzles being disposed in a middle portion of the combustion tower; an acid conduit system connecting the lower portion of the combusiton tower via a pump to said injection nozzles and to an annular acid-receiving cup surrounding concentrically an upper portion of the combustion tower and being secured thereto; an annular run off gutter being arranged outside said acid-receiving cup and secured near its upper end; a cone-shaped tower cover having a central opening and being gas-tightly connected to said acid-receiving cup; a phosphorus feed pipe terminating in the combustion nozzle being centrally passed through the central opening; the improvement according to which the run off gutter is provided with a plurality of overflow pipes so as to maintain a water jacket around the acid-receiving cup's upper part for cooling it; the cone-shaped tower cover forming, with resepct to the horizontal, an angle $\alpha$ of at least 19° and being provided near its upper end with a barrierr ring mounted perpendicularly with respect to the horizontal and concentrically with respect to the central opening therein, said barrier ring being spaced apart from, and concentrically surrounded by, a flexible rubber lip being hooked on a horizontally arranged supporting ring and lying loosely on the tower cover's upper side whereby even with quantities of coolant fluctuating at times, the water is distributed on the surface of the tower cover as a constantly uniform film; a water-cooled tubular air inlet being hooked concentrically to the phosphorus feed pipe and passed through the central opening in said tower cover; and a plurality of guide blades being mounted as an annular set, each of said blades being adjustable from the outside, said annular set being secured to the tower cover's upper end and being in alignment with the central opening in said cover, whereby a homogeneous mixing of the air, drawn through the air intake elbow, and of the liquid yellow phosphorus, sprayed by means of the combustion nozzle, is achieved, whereby a complete combustion of the phosphorus into phosphorus pentoxide is assured.

2. The apparatus as claimed in claim 1, wherein the combustion tower is made up of acidproof steel.

3. The apparatus as claimed in claim 1, wherein the angle $\alpha$ is equal to at most 25°.

4. The apparatus as claimed in claim 1, wherein the tubular air inlet comprises a plurality of separate adjacent tubular coils.

* * * * *